(12) United States Patent
Lai et al.

(10) Patent No.: US 7,003,005 B1
(45) Date of Patent: Feb. 21, 2006

(54) SIMPLIFIED LASER OSCILLATOR-AMPLIFIER SYSTEM

(76) Inventors: Ming Lai, P.O. Box 10845, Pleasanton, CA (US) 94588; Zhimin Qu, 5595-25 Springhouse Dr., Pleasanton, CA (US) 94588; Mehrdad Mohebi, 4837 Fawn Way, Dublin, CA (US) 94568

( * ) Notice: Subject to any disclaimer, the term of this patent is extended or adjusted under 35 U.S.C. 154(b) by 347 days.

(21) Appl. No.: 10/406,946

(22) Filed: Apr. 3, 2003

(51) Int. Cl.
*H01S 3/13* (2006.01)
*H01S 3/08* (2006.01)
*H01S 3/082* (2006.01)

(52) U.S. Cl. .............................. 372/30; 372/92; 372/97
(58) Field of Classification Search ................. 372/30, 372/97, 23, 92
See application file for complete search history.

(56) References Cited

U.S. PATENT DOCUMENTS

| | | | |
|---|---|---|---|
| 4,227,159 A * | 10/1980 | Barrett et al. | 372/70 |
| 5,053,641 A * | 10/1991 | Cheng et al. | 359/330 |
| 5,084,884 A * | 1/1992 | Terada | 372/29.022 |
| 5,136,596 A * | 8/1992 | Rao et al. | 372/20 |
| 5,644,424 A | 7/1997 | Backus et al. | |
| 5,671,241 A * | 9/1997 | Stamm et al. | 372/20 |
| 5,825,562 A | 10/1998 | Lai et al. | |
| 5,838,701 A | 11/1998 | Deutsch et al. | |
| 5,963,363 A | 10/1999 | Weston et al. | |
| 6,016,324 A | 1/2000 | Rieger et al. | |
| 6,031,854 A | 2/2000 | Lai | |
| 6,265,934 B1 * | 7/2001 | Wood | 330/4.5 |
| 2003/0142704 A1 * | 7/2003 | Lawandy | 372/21 |

* cited by examiner

*Primary Examiner*—Armando Rodriguez

(57) ABSTRACT

The present invention contemplates a simplified laser oscillator-amplifier system for deep UV generation. The simplified system employs same type of gain media in both the oscillator and the amplifier and utilizes a single pump pulse split to pump both the oscillator and the amplifier. A short cavity oscillator is operated near lasing threshold to produce a seed pulse with a narrow spectral bandwidth and long pulse duration. A short cavity amplifier is Q-switched to amplify the seed pulse to produce a single short pulse with good energy extraction efficiency. The amplifier is simply a short cavity, Q-switched laser. Short pulse is obtained with short cavity length and high gain of the amplifier. Consequently, the simplified laser oscillator-amplifier system can accommodate a long pump pulse to produce a nanosecond pulse suitable for deep UV laser generation.

20 Claims, 1 Drawing Sheet

SIMPLIFIED LASER OSCILLATOR-AMPLIFIER SYSTEM

FIELD OF THE INVENTION

The present invention relates to a laser system. In particular, the present invention relates to a simplified oscillator-amplifier laser system that is suitable for deep UV generation.

BACKGROUND OF THE INVENTION

Solid-state laser sources operated at deep UV wavelength around 200 nm are greatly desirable for photo-refractive surgeries. Such a deep UV laser source is expected to be more compact, more reliable, and require less maintenance in comparison with the excimer lasers, which is currently the dominant laser source for photo-refractive surgeries. More importantly, solid-state laser sources can be operated at a much higher repetition rate and with much less energy fluctuation compared with the excimer lasers. Scanning a deep UV laser beam with high repetition rate enables a variety of ablation shapes on a cornea surface and provides a great flexibility for the refractive surgeries. The improved stability in pulse energy from a solid-state UV laser source ensures accurate and controllable ablation.

In U.S. Pat. No. 6,031,854 to Lai, a diode pumped cascade laser is proposed for deep UV generation. The second laser employs a short cavity with only a gain medium and a wavelength selection element inside the cavity. When pumped by a laser pulse of 50 ns or shorter, the second laser is gain-switched to produce a pulse of nanosecond duration. This nanosecond laser pulse is then converted to deep UV radiation by a wavelength converter.

In the above approach, a short pump pulse is critical for generating a single short pulse with nanosecond duration and millijole energy. The pulse build-up time is proportional to the laser cavity length and inversely proportional to the net pump pulse energy above the lasing threshold of the cavity. When the pump pulse duration is longer than the build-up time of the laser pulse, a second pulse will appear. This results in smaller energy in the first pulse and thus lowers the conversion efficiency in deep UV generation.

It is well known in the art that a master oscillator—power amplifier system is a common approach to obtain amplified pulses of short duration, good beam profile, and narrow bandwidth. In such a system, the master oscillator is usually a low gain, low power laser to produce a seed pulse of certain specifications. The power amplifier is a high gain, high power laser to amplify the seed pulse up to much higher pulse energy. A number of master oscillator—power amplifier systems are commercially available from, for example, Lambda Physics of Germany and Continuum of Santa Clara, Calif.

The advantage of a master oscillator—power amplifier system is that the oscillator and the amplifier laser cavities can be optimized independently. The system, however, requires two pump sources and two gain media. Also, the system requires additional optics to inject the seed pulse from the oscillator to the amplifier and to isolate the amplified pulse from feeding back to the oscillator. As a result, a master oscillator—power amplifier system is usually complicated and expensive.

SUMMARY OF THE INVENTION

The present invention contemplates a simplified laser oscillator-amplifier system for deep UV generation. The simplified system employs the same type of gain media in both the oscillator and the amplifier and utilizes a single pump pulse split to pump both the oscillator and the amplifier. A short cavity oscillator is operated near lasing threshold to produce a seed pulse with a narrow spectral bandwidth. A short cavity amplifier is Q-switched to amplify the seed pulse to produce a single short pulse with good energy extraction efficiency. The amplifier is simply a short cavity, Q-switched laser. Short pulse is obtained with short cavity length and high gain of the amplifier. Consequently, the simplified laser oscillator-amplifier system can accommodate a long pump pules to produce a nanosecond pulse suitable for deep UV laser generation. In addition, the complication of pulse synchronization and optical isolation between oscillator and amplifier are substantially eliminated in this simplified laser oscillator-amplifier system.

According to a preferred embodiment of the present invention, a simplified laser oscillator-amplifier system comprises:
  a laser oscillator having a first gain medium and a spectrum control mechanism, said laser oscillator produces a seed pulse when said first gain medium is excited with a pump pulse;
  a laser amplifier having a second gain medium and a Q-switch, said laser amplifier amplifies said seed pulse to generate a short amplified pulse; and
  a pump pulse of radiation split to pump both said laser oscillator and said laser amplifier;
  wherein said laser oscillator-amplifier system produces a single amplified laser pulse with predetermined pulse energy and spectrum bandwidth.

Accordingly, one objective of the present invention is to provide a new and improved laser system for deep UV laser generation.

Another objective of the present invention is to provide a new and improved laser oscillator-amplifier system for generating single pulse of approximately nanosecond duration and millijole energy.

A further objective of the present invention is to provide a new and improved laser oscillator-amplifier system accommodating a long pump pulse to generate a single pulse of nanosecond duration.

These and other aspects and advantages of the invention will become more apparent in the following drawings, detailed description and claims.

DETAILED DESCRIPTION

Figure 1:
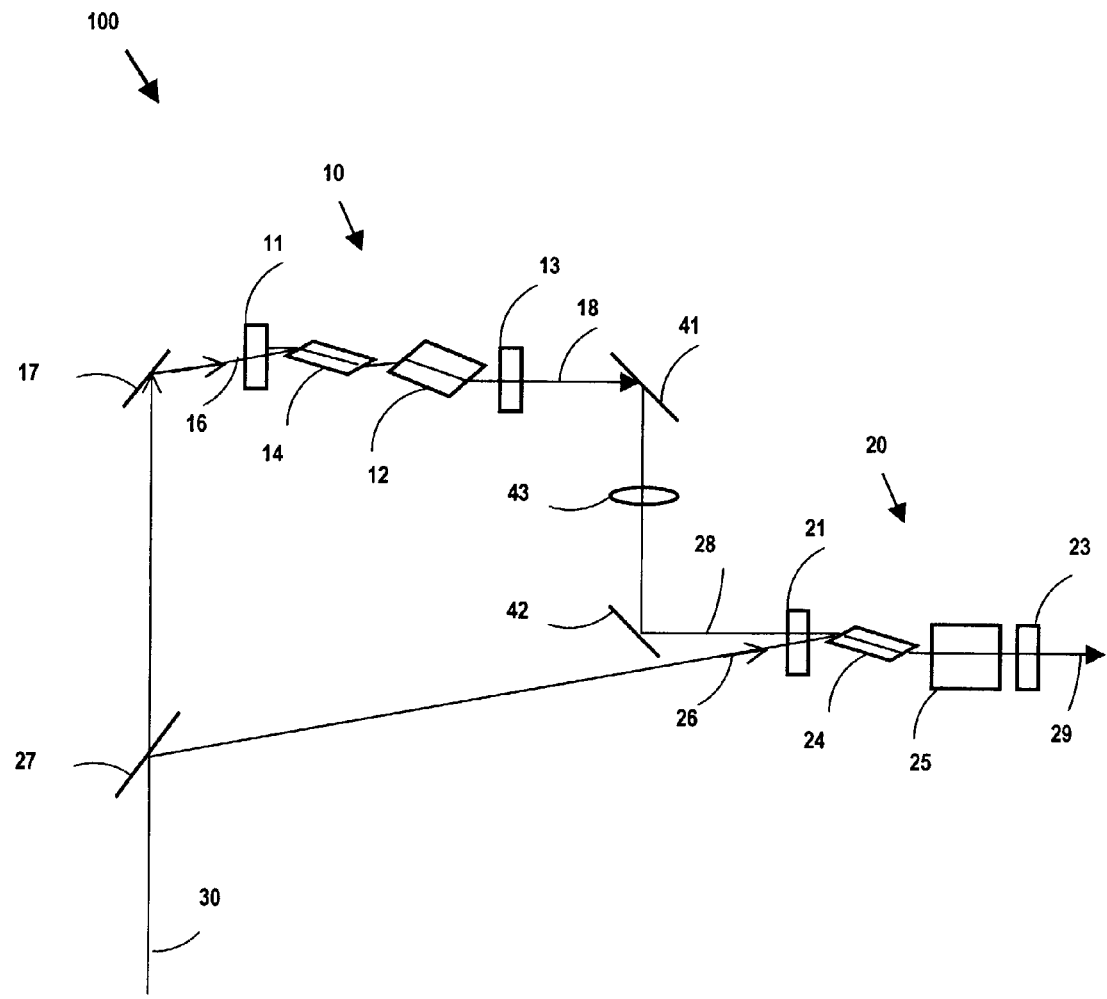
FIG. 1 is a schematic diagram showing a simplified laser oscillator-amplifier system, in accordance with the present invention.

FIG. 1 is a schematic diagram showing a simplified laser oscillator-amplifier system 100, in accordance with the present invention. The system 100 consists of primarily a laser oscillator 10, a laser amplifier 20, and a pump pulse 30. The system 100 further consists of coupling optics 17, 27, 41, 42, and 43. When excited by a pump pulse 30, the system 100 produces an output pulse 29.

The laser oscillator 10 consists of a first end mirror 11, a second end mirror 13, a gain medium 14, and a wavelength control element 12. The laser oscillator 10 is designed to operated at low pump threshold and to obtain a seed pulse 18 of narrow bandwidth and long pulse duration. A general guideline for the design of the laser oscillator 10 is low gain, low loss, and short cavity length.

The first end mirror 11 has a high reflectivity at the laser wavelength and high transmission at the pump pulse wavelength. The second end mirror 13 has a certain transmission at the laser wavelength and thus serves as an output coupler. The first end mirror 11 and second end mirror 13 are mirrors with multiple layer dielectric coatings to meet certain specifications known to those skilled in the art. Typically, the first end mirror 11 has a reflectivity higher than 99% at the laser wavelength, while the second end mirror 13 has a reflectivity of about 90 to 95% at the laser wavelength.

The gain medium 14 is a laser crystal, such as Ti:sapphire or Cr:LiSAIF. The gain medium 14 has a certain length and doping level such that it produces optimal gain at the laser wavelength when pumped by a pump pulse 16. The gain medium 14 is usually cut at Brewster angle to minimize reflection loss and to define the polarization of the seed laser pulse. Typically, the laser crystal 14 shall absorb about 90 to 95% of the pump energy in a single pass. Cooling to the gain medium 14 is critical for obtaining constant and stable operation.

The wavelength selection element 12 is to select the laser wavelength and to control the spectrum bandwidth of the seed laser pulse 18. A typical wavelength selection element 12 is a birefringent filter, which can be a single piece or a stack of crystal quartz plates aligned at a Brewster angle of incidence. For broad band solid state gain medium such as Ti:sapphire or Cr:LiSAIF, a stack of multiple quartz plates is required to obtain a narrow bandwidth spectrum in seed pulse generation. Typically, a quartz plate for this wavelength selection purpose has a thickness of 0.5 to 10 mm. When it is pumped with the pump pulse beam 16, the laser oscillator 10 produces a seed pulse beam 18.

The pump laser pulse 16 has a shorter wavelength than that of the seed pulse 18. To obtain a good beam overlap of the pump pulse beam 16 with the seed pulse beam 18 inside the gain medium 14, the pump pulse beam 16 is incident on the laser crystal 14 at an angle slightly bigger than the Brewster angle for the seed laser beam 18. To minimize the reflection loss of the pump pulse beam 16 at the laser crystal 14, the pump pule beam 16 shall have the same polarization as the seed pulse beam 18.

The laser amplifier 20 consists of a first end mirror 21, a second end mirror 23, a gain medium 24, and a Q-switch 25. The amplifier 20 is seeded by seed pulse 28 through coupling optics 41, 42, and 43. When pumped by pump pulse 26, the amplifier 20 amplifies seed pulse 28 and produces a short, amplified pulse 29.

The amplifier 20 is designed to obtain an output pulse 29 with optimal pulse energy and shortest pulse duration. The general guideline for the design of the laser amplifier 20 is high gain, high loss, and short cavity.

The first end mirror 21 and the second end mirror 23 are also dielectric mirrors. The loss of the amplifier cavity is chosen to be high such that the energy depletion time of the amplifier 20 can be short; a short depletion time leads to a short pulse generation. Typically, the first end mirror 21 has a reflectivity of about 98%, which allows effective seeding from the oscillator 10. The second end mirror 23 has a reflectivity of about 30% to 70% to serve as an output coupler.

The gain medium 24 is a same laser crystal as the oscillator 10 such that a single pump pulse can be split to pump both the oscillator 10 and the amplifier 20. The gain medium 24 has a predetermined length and doping level such that it produces optimal gain at the laser wavelength when pumped by a pump pulse 26. Cooling to the gain medium 24 is also critical for obtaining constant and stable operation. The selection and cooling of gain medium 24 are known to those skilled in the art.

The Q-switch 25 is to obtain high gain operation of the amplifier 20; and high gain operation is a key element for short pulse generation. Either AO Q-switch or EO Q-switch can be used for this purpose, while the latter is more preferable. An EO Q-switch can sustain higher gain and switch within a shorter time than an AO Q-switch does. In this application, the Q-switch 25 can be simply synchronized with the pump pulse 30. The selection and synchronization of a Q-switch 25 is also known to those skilled in the art.

The cavity length of the laser amplifier 20 shall be short; and a short cavity length is another key element for short pulse generation. The laser amplifier 20 consists of simply a gain medium 24 and a Q-switch 25 and thus the cavity length can be as short as 5 to 10 cm.

Similar to pump laser beam 16 to the gain medium 14 in the oscillator 10, the pump laser beam 26 to the gain medium 24 in the amplifier 20 shall have a certain incident angle and polarization with respect to the cavity laser beam 28. In addition, the first end mirror 21 shall have high transmission to the pump laser beam 26.

In the simplified laser oscillator—amplifier system 100 of FIG. 1, the coupling optics 27 is a beam splitter to split a good percentage of the pump pulse 30 into the pump pulse 26 for pumping the amplifier 20. The coupling optics 17 is a turning mirror to direct the split pump pulse 30 into the pump pulse 16 for pumping the oscillator 10. The coupling optics 41 and 42 are mirrors to direct the seed pulse 18 from the laser oscillator 10 into the laser amplifier 20. The coupling optics 43 is a lens to control the beam size of the seed pulse 28 to match the mode size of the laser amplifier 20. Commercially available design software may be used to assist the design of the laser oscillator 10 and the laser amplifier 20 for given parameters.

The Q-switch 25 is simply synchronized to the pump pulse 26 with a predetermined delay, which is about the pulse length of the pump pulse 26. Due to the short pulse length of the amplified pulse 29, "isolation" between the oscillator 10 and the amplifier 20 can be achieved by simply separating the oscillator 10 from the amplifier 20 with a traveling time longer than the amplified pulse duration.

For gain media 14 and 24 being Ti:sapphire laser crystals, the pump pulse 30 can be delivered from a Q-switched, frequency doubled Nd:YAG, Nd:YLF, or Yb:YAG laser. Typical pulse duration from these lasers is around 100 to 200 ns. To generate a deep UV laser beam suitable for photorefractive surgery, the amplified pulse 29 shall be in the range of 1 mJ to 5 mJ and pulse repetition rate shall be in the range of 200 Hz to 2000 Hz. The pump pulse 30 shall thus have pulse energy of 3 mJ to 15 mJ. The above designed simplified oscillator—amplifier system 100 shall produce amplified pulse 29 with pulse duration of approximately 1 ns to 5 ns and a pulse spectral bandwidth of approximately 0.01 nm to 0.1 nm.

In one embodiment, the simplified laser oscillator—amplifier system 100 employs Ti:sapphire laser crystals as gain medium 14 and gain medium 24. The pump pulse 30 is delivered from a Q-switched, frequency doubled Nd:YLF laser having a pulse duration of about 150 ns, pulse energy of about 8 mJ, and a pulse repetition rate of about 1 kHz. The laser oscillator 10 and the laser amplifier 20 have each a cavity length of about 5 to 10 cm. The pump pulse 30 is split by beam splitter 27 to have about 7 mJ for pump pulse 26 and 1 mJ for pump pulse 16. The laser oscillator 10 comprises a stack of three quartz plates and produces a seed pulse 18 of about 0.2 mJ with a spectral bandwidth of 0.02 nm and a pulse duration of about 100 ns. The laser amplifier 20 comprises an EO Q-switch 25 and a 50% output coupler 23. The amplifier 20 is located about 1 meter away from the oscillator 10. The simplified oscillator-amplifier system 100 is expected to produce an amplified pulse 29 with pulse energy of about 2 mJ, a wavelength around 830 nm, pulse duration shorter than 5 ns, and a spectral bandwidth narrower than 0.05 nm.

The amplified pulse 29 is particular useful for fourth harmonics generation to produce deep UV pulse for refractive surgery, as described in U.S. Pat. No. 6,031,854 to Lai. The above figure and description are intended for illustrating the present invention. It is understood that various modification can be made without departing from the scopes of the invention as defined in the appended claims.

What is claimed is:

1. A simplified laser oscillator-amplifier system comprising:
   a laser oscillator having a first gain medium and a spectrum control mechanism, said laser oscillator produces a seed pulse when said gain medium is excited with a pump pulse;
   a laser amplifier having a second gain medium and a Q-switch, said laser amplifier amplifies said seed pulse to generate a short amplifier pulse having said pulse duration of approximately 1 ns to 5 ns; and
   a pump pulse of radiation split to pump both said laser oscillator and said laser amplifier;
   wherein said laser oscillator-amplifier system produces a single amplified laser pulse with predetermined pulse energy and spectrum bandwidth.

2. A simplified laser oscillator-amplifier system as in claim 1 wherein said laser oscillator has a first end mirror and a second end mirror.

3. A simplified laser oscillator-amplifier system as in claim 1 wherein said laser oscillator has a cavity length of approximately 5 to 10 cm.

4. A simplified laser oscillator-amplifier system as in claim 1 wherein said first gain medium and said second gain medium are selected from TI:sapphire or Cr:LiSAIF laser rods.

5. A simplified laser oscillator-amplifier system as in claim 1 wherein said first gain medium or said second gain medium is cut for Brewster angle of incidence to control the polarization of said seed pulse.

6. A simplified laser oscillator-amplifier system as in claim 1 wherein said spectrum control mechanism is a birefringent filter to control the wavelength and bandwidth of said seed pulse.

7. A simplified laser oscillator-amplifier system as in claim 1 wherein said spectrum control mechanism is a single piece or a stack of quartz plates to control the wavelength and bandwidth of said seed pulse.

8. A simplified laser oscillator-amplifier system as in claim 1 wherein said laser amplifier has a cavity length of approximately 5 to 10 cm.

9. A simplified laser oscillator-amplifier system as in claim 1 wherein said Q-switch is an electro-optical Q-switch.

10. A simplified laser oscillator-amplifier system as in claim 1 wherein said pump pulse is a frequency doubled laser pulse delivered from a Q-switched YAG or YLF laser.

11. A simplified laser oscillator-amplifier system as in claim 1 wherein said pump pulse has a pulse duration of about 100 to 200 ns.

12. A simplified laser oscillator-amplifier system as in claim 1 wherein said pump pulse has a repetition rate of approximately 200 Hz to 2000 Hz.

13. A simplified laser oscillator-amplifier system as in claim 1 wherein said pump pulse has a pulse energy of about 3 mJ to 15 mJ.

14. A simplified laser oscillator-amplifier system as in claim 1 wherein said amplified laser pulse has a pulse energy of approximately 1 mJ to 5 mJ.

15. A simplified laser oscillator-amplifier system as in claim 1 wherein said amplifier laser pulse has a spectrum bandwidth of approximately 0.01 nm to 0.1 nm.

16. A simplified laser oscillator-amplifier system comprising:
   a laser oscillator having a first gain medium and a spectrum control mechanism, said laser oscillator produces a seed pulse when said gain medium is excited with a pump pulse;
   a laser amplifier having a second gain medium and a Q-switch, said laser amplifier has a cavity length of approximately 5 to 10 cm and amplifies said seed pulse to generate a short amplified pulse having a pulse duration of approximately 1 ns to 5 ns; and
   said pump pulse of radiation split to pump both said laser oscillator and said laser amplifier;
   wherein said laser oscillator-amplifier system produces a single amplified laser pulse with predetermined pulse energy and spectrum bandwidth.

17. A simplified laser oscillator-amplifier system as in claim 16 wherein said amplified laser pulse has a pulse energy of approximately 1 mJ to 5 mJ.

18. A simplified laser oscillator-amplifier system as in claim 16 wherein said amplified laser pulse has a spectrum bandwidth of approximately 0.01 nm to 0.1 nm.

19. A simplified laser oscillator-amplifier system comprising:
   a laser oscillator having a first gain medium and a spectrum control mechanism, said laser oscillator produces a seed pulse when said gain medium is excited with a pump pulse;
   a laser amplifier having a second gain medium and a Q-switch, said laser amplifier amplifies said seed pulse to generate a short amplified pulse having a pulse duration of approximately 1 ns to 5 ns and a pulse energy of approximately 1 mJ to 5 mJ.; and
   said pump pulse of radiation split to pump both said laser oscillator and said laser amplifier;
   wherein said laser oscillator-amplifier system produces a single amplified laser pulse with predetermined spectrum bandwidth.

20. A simplified laser oscillator-amplifier system as in claim 10 wherein said amplified laser pulse has a spectrum bandwidth of approximately 0.01 nm to 0.1 nm.

* * * * *